(12) United States Patent
Pezeshki et al.

(10) Patent No.: US 12,356,219 B2
(45) Date of Patent: Jul. 8, 2025

(54) UPDATE RESOLUTION SIGNALING IN FEDERATED LEARNING

(71) Applicant: QUALCOMM Incorporated, San Diego, CA (US)

(72) Inventors: Hamed Pezeshki, San Diego, CA (US); Sony Akkarakaran, Poway, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 440 days.

(21) Appl. No.: 17/449,780

(22) Filed: Oct. 1, 2021

(65) Prior Publication Data

US 2022/0124518 A1 Apr. 21, 2022

Related U.S. Application Data

(60) Provisional application No. 63/198,407, filed on Oct. 15, 2020.

(51) Int. Cl.
*H04W 24/02* (2009.01)
*G06N 20/00* (2019.01)

(52) U.S. Cl.
CPC ............ *H04W 24/02* (2013.01); *G06N 20/00* (2019.01)

(58) Field of Classification Search
CPC ....... H04W 24/00; H04W 24/02; G06N 20/00
See application file for complete search history.

(56) References Cited

U.S. PATENT DOCUMENTS

| | | | |
|---|---|---|---|
| 2018/0167842 A1* | 6/2018 | Bergström | H04W 28/0278 |
| 2018/0232637 A1* | 8/2018 | Caicedo Fernandez | G06N 3/048 |
| 2019/0340534 A1* | 11/2019 | McMahan | H04L 67/01 |
| 2020/0218982 A1* | 7/2020 | Annau | G06F 7/49963 |
| 2020/0356845 A1* | 11/2020 | Pfeil | G06N 3/063 |
| 2021/0067339 A1* | 3/2021 | Schiatti | G06F 16/27 |
| 2021/0160149 A1* | 5/2021 | Ma | H04W 24/02 |
| 2021/0203565 A1* | 7/2021 | Arora | G06N 5/04 |
| 2023/0010095 A1* | 1/2023 | Alabbasi | G06F 9/54 |
| 2023/0232211 A1* | 7/2023 | Hong | H04W 8/22 455/422.1 |

* cited by examiner

*Primary Examiner* — Jeong S Park
(74) *Attorney, Agent, or Firm* — Harrity & Harrity, LLP

(57) ABSTRACT

Various aspects of the present disclosure generally relate to wireless communication. In some aspects, a user equipment (UE) may determine an update resolution associated with providing, to a base station during a federated learning procedure, an update associated with a machine learning component. The UE may transmit the update to the base station based at least in part on the update resolution. Numerous other aspects are provided.

31 Claims, 10 Drawing Sheets

UPDATE RESOLUTION SIGNALING IN FEDERATED LEARNING

CROSS-REFERENCE TO RELATED APPLICATION

This Patent application claims priority to U.S. Provisional Patent Application No. 63/198,407, filed on Oct. 15, 2020, entitled "UPDATE RESOLUTION SIGNALING IN FEDERATED LEARNING," and assigned to the assignee hereof. The disclosure of the prior Application is considered part of and is incorporated by reference into this Patent Application.

INTRODUCTION

Aspects of the present disclosure generally relate to wireless communication and to techniques and apparatuses for update resolution signaling federated learning.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) includes determining an update resolution associated with providing, to a base station during a federated learning procedure, an update associated with a machine learning component; and transmitting the update to the base station based at least in part on the update resolution.

In some aspects, a method of wireless communication performed by a base station includes determining an update resolution associated with receiving, from a UE during a federated learning procedure, an update associated with a machine learning component; and receiving the update from the UE based at least in part on the update resolution.

In some aspects, a UE for wireless communication includes a memory and one or more processors coupled to the memory, the one or more processors configured to determine an update resolution associated with providing, to a base station during a federated learning procedure, an update associated with a machine learning component; and transmit the update to the base station based at least in part on the update resolution.

In some aspects, a base station for wireless communication includes a memory and one or more processors coupled to the memory, the one or more processors configured to determine an update resolution associated with receiving, from a UE during a federated learning procedure, an update associated with a machine learning component; and receive the update from the UE based at least in part on the update resolution.

In some aspects, a non-transitory computer-readable medium storing a set of instructions for wireless communication includes one or more instructions that, when executed by one or more processors of a UE, cause the UE to determine an update resolution associated with providing, to a base station during a federated learning procedure, an update associated with a machine learning component; and transmit the update to the base station based at least in part on the update resolution.

In some aspects, a non-transitory computer-readable medium storing a set of instructions for wireless communication includes one or more instructions that, when executed by one or more processors of a base station, cause the base station to: determine an update resolution associated with receiving, from a UE during a federated learning procedure, an update associated with a machine learning component; and receive the update from the UE based at least in part on the update resolution.

In some aspects, an apparatus for wireless communication includes means for determining an update resolution associated with providing, to a base station during a federated learning procedure, an update associated with a machine learning component; and means for transmitting the update to the base station based at least in part on the update resolution.

In some aspects, an apparatus for wireless communication includes means for determining an update resolution associated with receiving, from a UE during a federated learning procedure, an update associated with a machine learning component; and means for receiving the update from the UE based at least in part on the update resolution.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
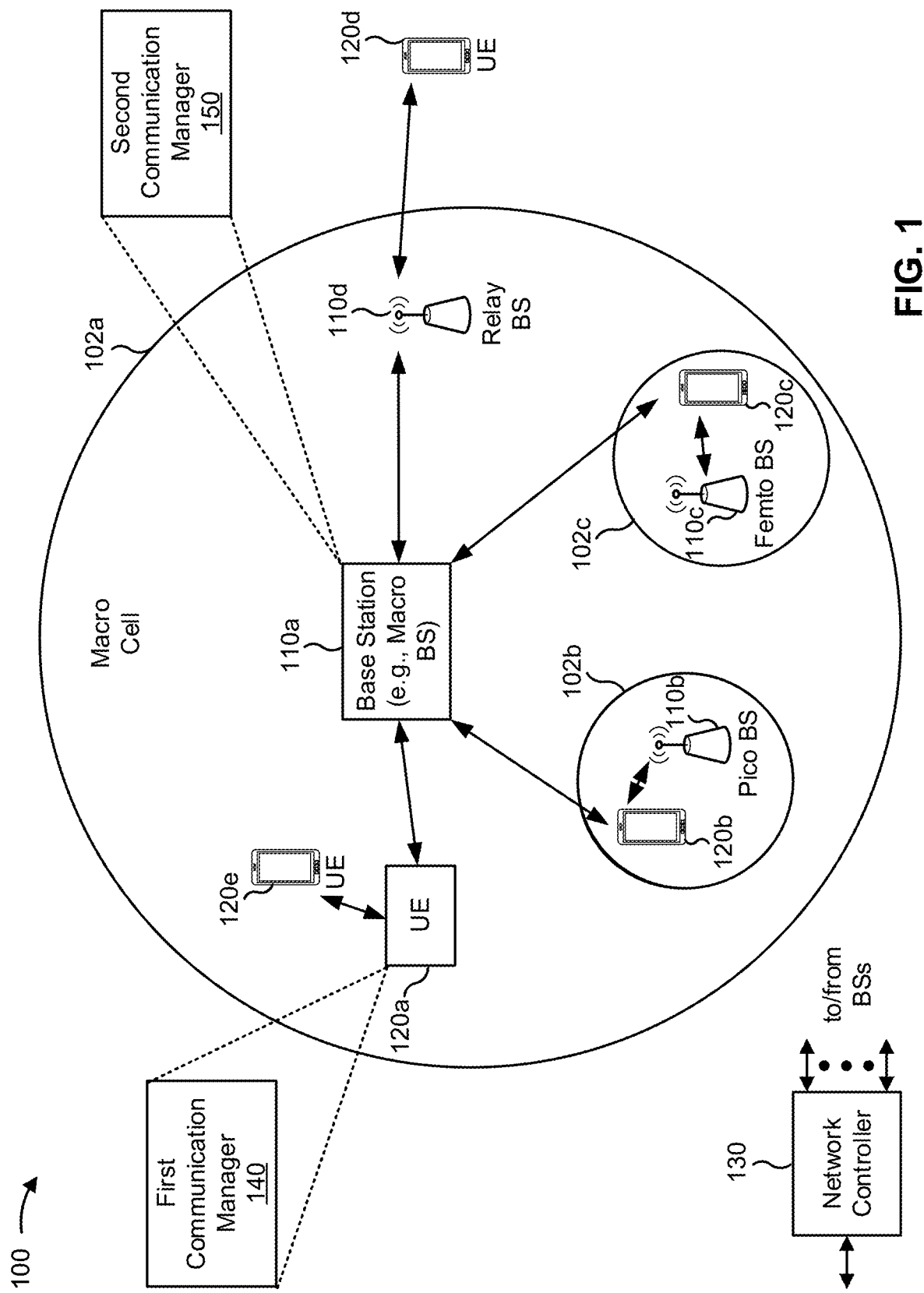
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

In some aspects, the wireless network 100 may include one or more non-terrestrial network (NTN) deployments in which a non-terrestrial wireless communication device may include a UE (referred to herein, interchangeably, as a "non-terrestrial UE"), a BS (referred to herein, interchangeably, as a "non-terrestrial BS" and "non-terrestrial base station"), and/or a relay station (referred to herein, interchangeably, as a "non-terrestrial relay station"), among other examples. As used herein, "NTN" may refer to a network for which access is facilitated by a non-terrestrial UE, a non-terrestrial BS, and/or a non-terrestrial relay station, among other examples.

The wireless network 100 may include any number of non-terrestrial wireless communication devices. A non-terrestrial wireless communication device may include a satellite, a manned aircraft system, and/or an unmanned aircraft system (UAS) platform, among other examples. A satellite may include a low-earth orbit (LEO) satellite, a medium-earth orbit (MEO) satellite, a geostationary earth orbit (GEO) satellite, and/or a high elliptical orbit (HEO) satellite, among other examples. A manned aircraft system may include an airplane, helicopter, and/or a dirigible, among other examples. A UAS platform may include a high-altitude platform station (HAPS), and may include a balloon, a dirigible, and/or an airplane, among other examples. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of BSs (e.g., stationary and/or ground-based BSs), relay stations, and/or one or more components and/or devices included in a core network of wireless network 100, among other examples.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. For example, in some aspects, the wireless network 100 may be, include, or be included in a wireless backhaul network, sometimes referred to as an integrated access and backhaul (IAB) network. In an IAB network, at least one base station (e.g., base station 110) may be an anchor base station that communicates with a core network via a wired backhaul link, such as a fiber connection. An anchor base station may also be referred to as an IAB donor (or IAB-donor), a central entity, and/or a central unit, among other examples. An IAB network may include one or more non-anchor base stations, sometimes referred to as relay base stations, IAB nodes (or IAB-nodes). The non-anchor base station may communicate directly with or indirectly with (e.g., via one or more non-anchor base stations) the anchor base station via one or more backhaul links to form a backhaul path to the core network for carrying backhaul traffic. Backhaul links may be wireless links. Anchor base station(s) and/or non-anchor base station(s) may communicate with one or more UEs (e.g., UE 120) via access links, which may be wireless links for carrying access traffic.

In some aspects, a radio access network that includes an IAB network may utilize millimeter wave technology and/or directional communications (e.g., beamforming and/or precoding among other examples) for communications between base stations and/or UEs (e.g., between two base stations, between two UEs, and/or between a base station and a UE). For example, wireless backhaul links between base stations may use millimeter waves to carry information and/or may be directed toward a target base station using beamforming and/or precoding, among other examples. Similarly, wireless access links between a UE and a base station may use millimeter waves and/or may be directed toward a target wireless node (e.g., a UE and/or a base station). In this way, inter-link interference may be reduced.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As shown in FIG. 1, the UE 120 may include a first communication manager 140. As described in more detail elsewhere herein, the first communication manager 140 may determine an update resolution associated with providing, to a base station during a federated learning procedure, an update associated with a machine learning component; and transmit the update to the base station based at least in part on the update resolution. Additionally, or alternatively, the first communication manager 140 may perform one or more other operations described herein. The term "update resolution" refers to the accuracy of the quantized updates (e.g., gradient vectors). For example, one quantization scheme that may be used is a sign stochastic gradient descent (signSGD) in which gradient elements are quantized to a single bit such that only the sign corresponding to each (e.g., "+" or "−") is transmitted. Higher update resolution corresponds to higher quantization levels (and, thus, a larger number of bits) and smaller update resolution corresponds to lower quantization levels (and, thus, a smaller number of bits). For example, an 8-bit resolution is more accurate than a 3-bit resolution.

In some aspects, the base station 110 may include a second communication manager 150. As described in more detail elsewhere herein, the second communication manager 150 may determine an update resolution associated with receiving, from a UE during a federated learning procedure, an update associated with a machine learning component; and receive the update from the UE based at least in part on the update resolution. Additionally, or alternatively, the second communication manager 150 may perform one or more other operations described herein.

As indicated above, FIG. 1 is provided as an example. Other examples may differ from what is described with regard to FIG. 1.

Figure 2:
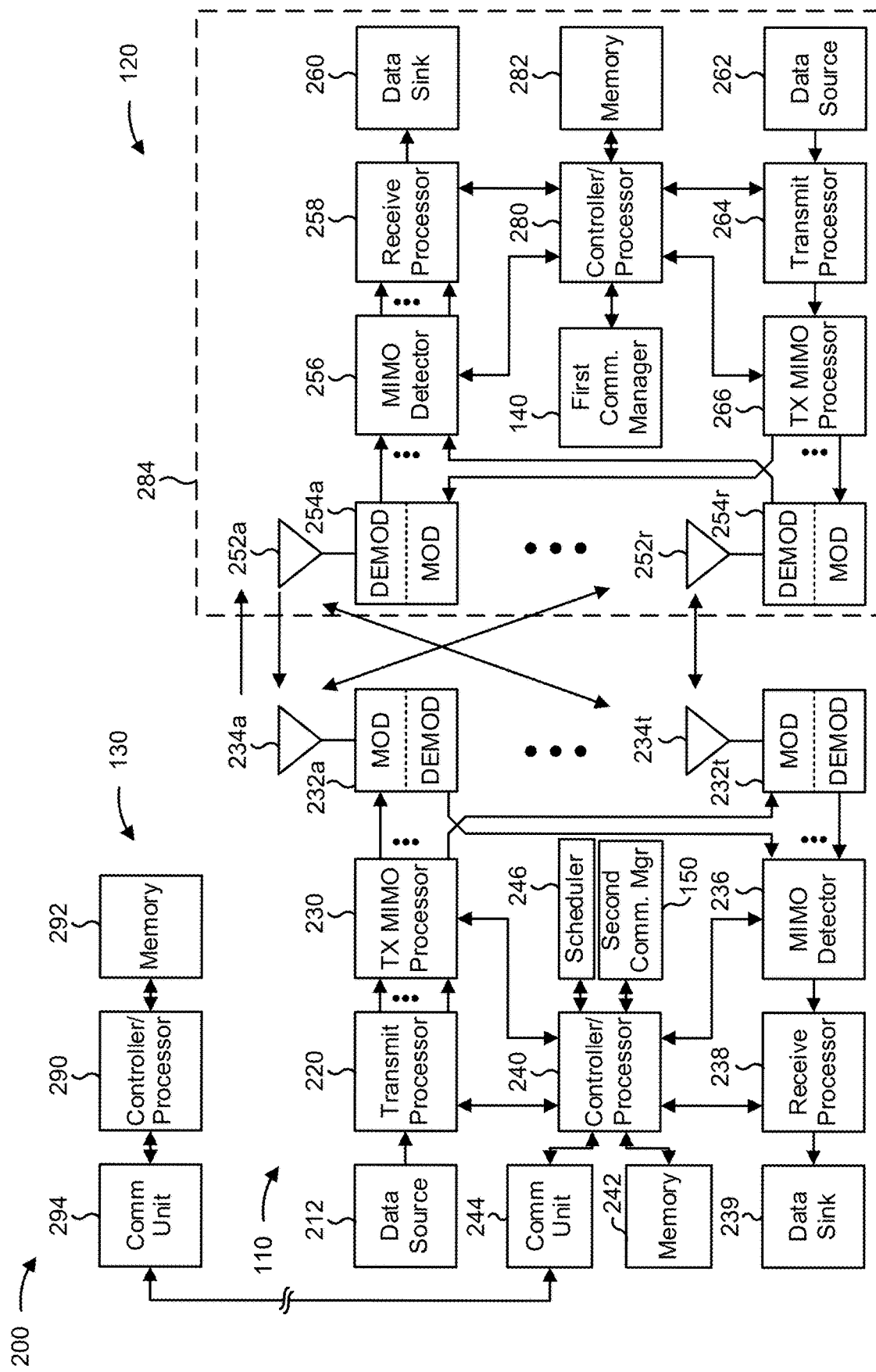
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-10.

Controller/processor 240 of base station 110, controller/processor 280 of UE 120, and/or any other component(s) of FIG. 2 may perform one or more techniques associated with update resolution signaling federated learning, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, UE 120 may include means for determining an update resolution associated with providing, to a base station during a federated learning procedure, an update associated with a machine learning component and/or means for transmitting the update to the base station based at least in part on the update resolution, among other examples. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258, among other examples.

In some aspects, base station 110 may include means for determining an update resolution associated with receiving, from a UE during a federated learning procedure, an update associated with a machine learning component and/or means for receiving the update from the UE based at least in part on the update resolution, among other examples. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
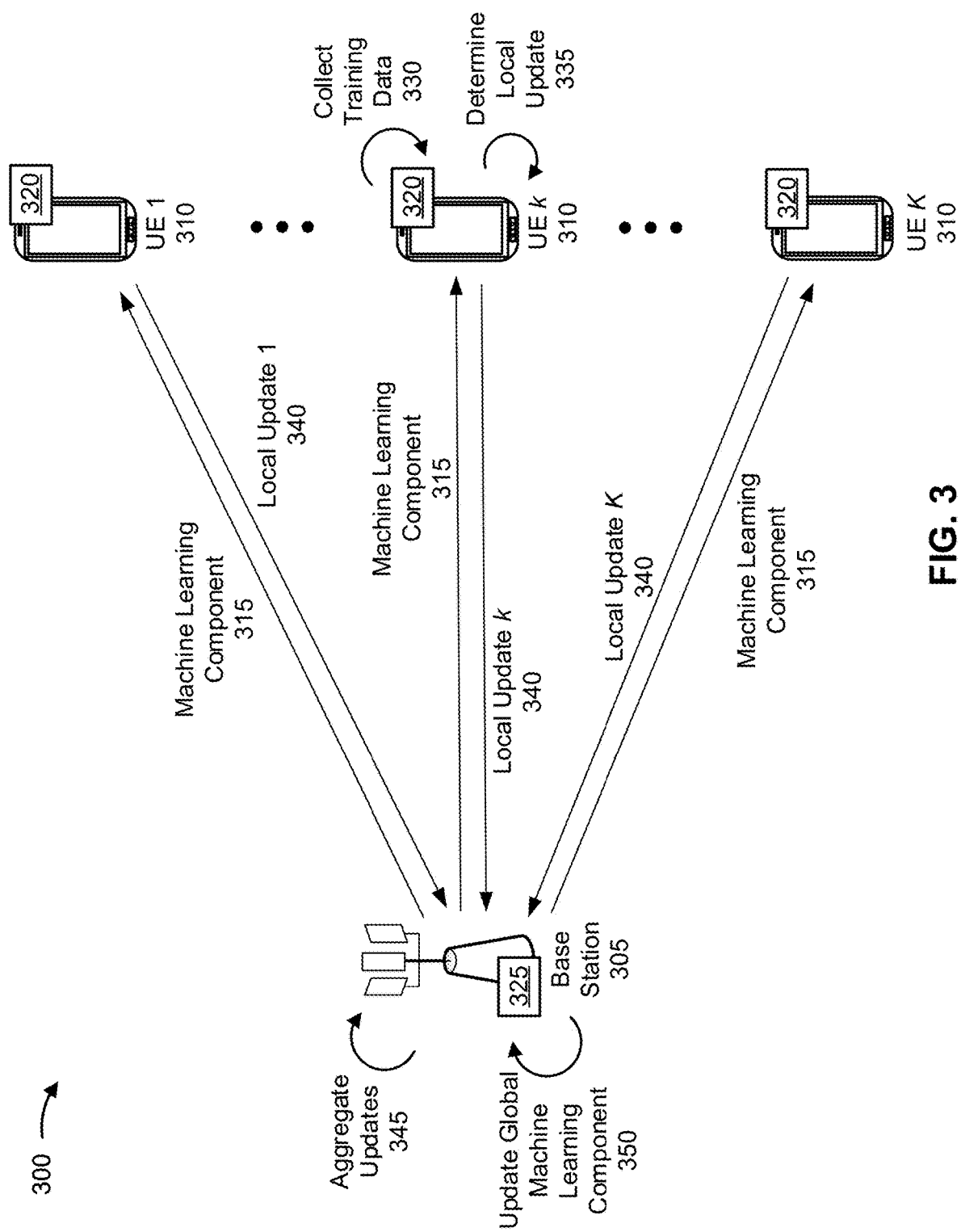
FIG. 3 is a diagram illustrating an example associated with federated learning, in accordance with the present disclosure.

FIG. 3 is a diagram illustrating an example 300 of federated learning, in accordance with the present disclosure. As shown, a base station 305 may communicate with a set of UEs 310 (shown as "UE 1, . . . , UE k, . . . , and UE K"). The base station 305 and the UEs 310 may communicate with one another via a wireless network (e.g., the wireless network 100 shown in FIG. 1). In some aspects, any number of additional UEs 310 may be included in the set of K UEs 310. The base station 305 may be, or be similar to, base station 110 shown in FIG. 1. One or more of the UEs 310 may be, or be similar to, UE 120 shown in FIG. 1.

As shown by reference number 315, the base station 305 may transmit a machine learning component to each of the UEs 310. As shown, the UEs 310 may include a first communication manager 320, which may be, or be similar to, the first communication manager 140 shown in FIG. 1. The first communication manager 320 may be configured to utilize the machine learning component to perform one or more wireless communication tasks and/or one or more user interface tasks. The first communication manager 320 may be configured to utilize any number of additional machine learning components.

As shown in FIG. 3, the base station 305 may include a second communication manager 325, which may be, or be similar to, the second communication manager 150 shown in FIG. 1. The second communication manager 325 may be configured to utilize a global machine learning component to perform one or more wireless communication tasks, to perform one or more user interface tasks, and/or to facilitate federated learning associated with the machine learning component.

The UEs 310 may locally train the machine learning component using training data collected by the UEs, respectively. A UE 310 may train a machine learning component such as a neural network by optimizing a set of model parameters, $w^{(n)}$, associated with the machine learning component, where n is the federated learning round index. The set of UEs 310 may be configured to provide updates to the base station 305 multiple times (e.g., periodically, on demand, upon updating a local machine learning component, etc.).

"Federated learning round" refers to the training done by a UE 310 that corresponds to an update provided by the UE 310 to the base station 305. In some aspects, federated learning round may refer to the transmission by a UE 310, and the reception by the base station 305, of an update. The federated learning round index n indicates the number of the rounds since the last global update was transmitted by the base station 305 to the UE 310. The initial provisioning of a machine learning component on a UE 310 and/or the transmission of a global update to the machine learning component to a UE 310, among other examples, may trigger the beginning of a new round of federated learning.

In some aspects, for example, the first communication manager 320 of the UE 310 may determine an update corresponding to the machine learning component by training the machine learning component. In some aspects, as shown by reference number 330, the UEs 310 may collect training data and store it in memory devices. The stored training data may be referred to as a "local dataset." As shown by reference number 335, the UEs 310 may each determine a local update associated with the machine learning component.

In some aspects, for example, the first communication manager 320 may access training data from the memory device and use the training data to determine an input vector, $x_j$, to be input into the machine learning component to generate a training output (which may also be referred to as a "ground truth label"), $y_j$, from the machine learning component. The input vector $x_j$ may include an array of input values, and the training output $y_j$ may include a value (e.g., a value between 0 and 9). For example, in the case of a neural network designed to detect handwritten digits in an image, the input vector $x_j$ may be a vectorized image of handwritten digits and the training output $y_j$, may be the detected digits.

The training output $y_j$ may be used to facilitate determining the model parameters $w^{(n)}$ that maximize a variational lower bound function. A negative variational lower bound function, which is the negative of the variational lower bound function, may correspond to a local loss function, $F_k(w)$ which may be expressed as:

$$F_k(w) = \frac{1}{|D_k|} \Sigma_{(x_j, y_j) \in D_k} f(w, x_j, y_j),$$

where $D_k$ is the size of the local dataset associated with the UE k. A stochastic gradient descent (SGD) algorithm may be used to optimize the model parameters $w^{(n)}$. The first communication manager 320 may perform one or more SGD procedures to determine the optimized parameters $w^{(n)}$ and may determine the gradients, $g_k^{(n)} \nabla F_k(w^{(n)})$, of the loss function $F_k(w)$. The first communication manager 320 may further refine the machine learning component based at least in part on the loss function value, and/or the gradients, among other examples.

By repeating this process of training the machine learning component to determine the gradients $g_k^{(n)}$ a number of times, the first communication manager 320 may determine an update corresponding to the machine learning component. Each repetition of the training procedure described above may be referred to as an epoch. In some aspects, the update may include an updated set of model parameters $w^{(n)}$, a difference between the updated set of model parameters $w^{(n)}$ and a prior set of model parameters $w^{(n-1)}$, the set of gradients $g_k^{(n)}$, and/or an updated machine learning component (e.g., an updated neural network model), among other examples.

As shown by reference number 340, the UEs 310 may transmit their respective local updates (shown as "local update 1, . . . , local update k, . . . , local update K"). In some aspects, the local update may include a compressed version of a local update. For example, in some aspects, a UE 310 may transmit a compressed set of gradients, $\tilde{g}_k^{(n)} = q(g_k^{(n)})$, where q represents a compression scheme applied to the set of gradients $g_k^{(n)}$.

As shown by reference number 345, the base station 305 (e.g., using the second communication manager 325) may aggregate the updates received from the UEs 310. For example, the second communication manager 325 may average the received gradients to determine an aggregated update, which may be expressed as $$g^{(n)} = \frac{1}{K}\sum_{k=1}^{K} \tilde{g}_k^{(n)},$$

where, as explained above, K is the total number of UEs 310 from which updates were received. In some examples, the second communication manager 325 may aggregate the received updates using any number of other aggregation techniques.

As shown by reference number 350, the second communication manager 325 may update the global machine learning component based on the aggregated updates. In some aspects, for example, the second communication manager 325 may update the global machine learning component by normalizing the local datasets by treating each dataset size, $D_k$, as being equal. The second communication manager 325 may update the global machine learning component using multiple rounds of updates from the UEs 310 until a global loss function is minimized (which may be referred to as "convergence" of the machine learning component). The global loss function may be given, for example, by:

$$F(w) = \frac{\sum_{k=1}^{K}\Sigma_{j\in D_k}f_j(w)}{K*D} = \frac{1}{K}\sum_{k=1}^{K} F_k(w),$$

where $D_k$=D, and where D is a constant (e.g., based on an assumption, for simplification, that the dataset sizes are the same). In some aspects, the base station 305 may transmit an update associated with the updated global machine learning component to the UEs 310.

Federated learning involves repeated updates to a machine learning component. Local updates are transmitted from UEs to a base station. Hundreds or thousands of federated learning rounds may be performed before convergence is achieved. Additionally, machine learning components may be updated frequently due to changes in environmental variables and/or updates in available training data, among other examples. As a result, using a fixed resolution of the updates may lead to unnecessary communication overhead and/or may negatively impact network performance.

Aspects of the techniques and apparatuses described herein may facilitate update resolution selection and management for federated learning. In some aspects, a UE may receive a machine learning component from a base station and may locally train the machine learning component to determine a local update associated with the machine learning component. Update resolutions may be configured by the base station and/or selected by the UE. In some aspects, update resolutions may be determined based at least in part on UE capabilities, and/or message payload size, among other examples. As a result, aspects of the techniques and apparatuses described herein may result in reduced communication overhead and/or may positive impacts on network performance.

As indicated above, FIG. 3 is provided merely as an example. Other examples may differ from what is described with regard to FIG. 3.

Figure 4:
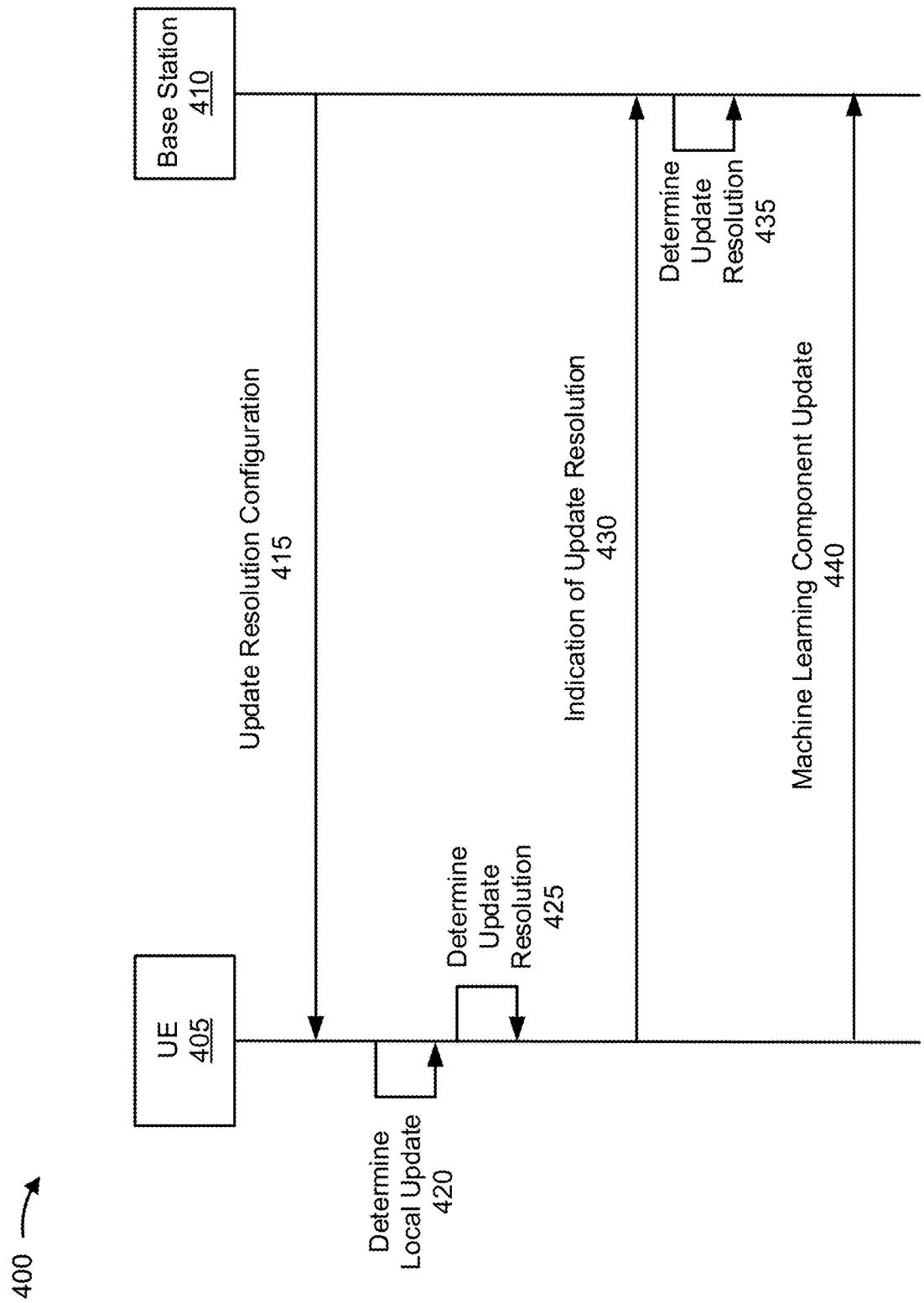
FIG. 4 is a diagram illustrating an example associated with update resolution signaling federated learning, in accordance with the present disclosure.

FIG. 4 is a diagram illustrating an example 400 associated with periodic communication schemes for federated learning, in accordance with the present disclosure. As shown, a UE 405 and a base station 410 may communicate with one another. The UE 405 and the base station 410 may communicate using a wireless network (e.g., wireless network 100 shown in FIG. 1). The UE 405 may be, or be similar to, UE 120 shown in FIG. 1. The base station 410 may be, or be similar to, the base station 110 shown in FIG. 1. In some aspects, any number of additional UEs 405 may communicate with the base station 410.

In some aspects, the UE 405 may determine an update resolution associated with providing, to the base station 410 during a federated learning procedure, an update associated with a machine learning component. The update resolution may be configured by the base station and/or selected by the UE 405. As shown by reference number 415, for example, the base station 410 may transmit, and the UE 405 may receive, an update resolution configuration. The update resolution configuration may be carried in a radio resource control (RRC) message, a medium access control (MAC) control element (MAC-CE), and/or a downlink control information (DCI) transmission, among other examples.

The update resolution configuration may indicate an update resolution associated with providing, to the base station 410 during a federated learning procedure, an update associated with a machine learning component. This configured update resolution may be fixed for a whole duration of a federated learning algorithm or may be a function of the federated learning algorithm iteration.

As shown by reference number 420, the UE 405 may determine a local update associated with the machine learning component based at least in part on training data collected by the UE 405 (e.g., using a process similar to that described above in connection with FIG. 3). As shown by reference number 425, the UE 405 may determine an update resolution associated with providing, to the base station 410 during a federated learning procedure, an update associated with a machine learning component. In some aspects, the UE 405 may determine the update resolution based at least in part on the update resolution configuration, as indicated above.

In some aspects, resolution selection may be implicit. For example, the UE 405 may determine the update resolution based on a federated learning iteration round. In this manner, for example, a low update resolution may be used during initial rounds, and a higher update resolution may be used in later rounds. In some aspects, the update resolution may correspond to a first set of federated learning rounds. The update resolution configuration may indicate an additional update resolution that corresponds to a second set of federated learning rounds.

The UE 405 may determine a round index associated with a current federated learning round and may determine that the round index corresponds to the first set of federated learning rounds. The UE 405 may determine the update resolution based at least in part on determining that the round index corresponds to the first set of federated learning rounds. In this way, dynamic indication of update resolution may be omitted, thereby reducing signaling overhead.

In some aspects, the UE 405 may determine the update resolution based at least in part on a resolution capability of the UE 405. In some aspects, the UE 405 may determine the update resolution based at least in part on a size of a message carrying the update. For example, the UE 405 may determine a size of an allocated physical uplink shared channel (PUSCH) message and may determine the update resolution based at least in part on the size of the PUSCH message. In this way, since larger allocated messages may carry larger payloads, the update resolution can be proportionally related to the message size.

As shown by reference number 430, the UE 405 may transmit, and the base station 410 may receive, an indication of the update resolution. In some aspects, the UE 405 may transmit the indication of the update resolution with the machine learning component update. In some aspects, the UE 405 may transmit the indication of the update resolution separately from the update. As shown by reference number 435, the base station 410 may determine the update resolution. For example, in some aspects, the base station 410 may determine the update resolution based at least in part on a configuration provided to the UE 405 and/or an indication of the update resolution received from the UE 405, among other examples.

As shown by reference number 440, the UE 405 may transmit, and the base station 410 may receive, a machine learning component update. The machine learning component update may include the local update determined by the UE 405. The UE 405 may transmit the update based at least in part on a resource allocation and/or the update resolution configuration, among other examples. In some aspects, the update may include one or more gradients of a local loss function corresponding to the machine learning component. The base station 410 may decode and process the machine learning component update based at least in part on the update resolution.

As indicated above, FIG. 4 is provided merely as an example. Other examples may differ from what is described with regard to FIG.

Figure 5:
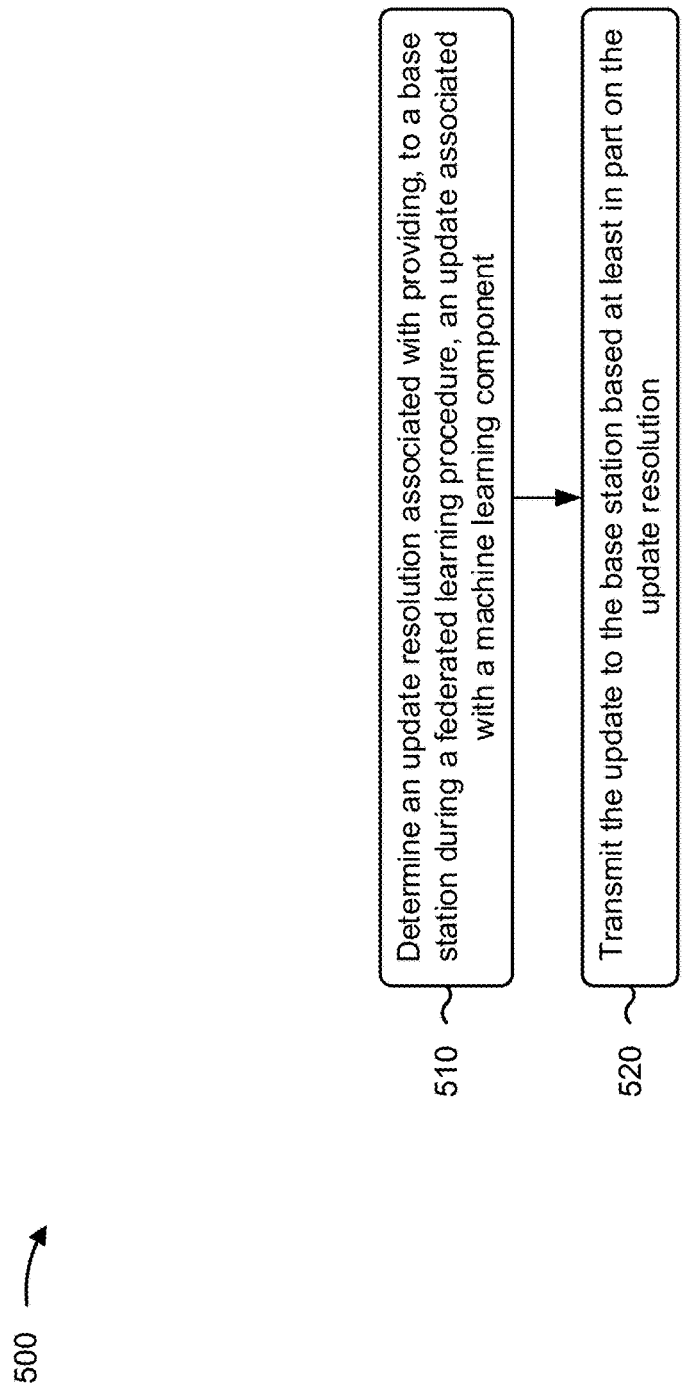
FIGS. 5 and 6 are diagrams illustrating example processes associated with update resolution signaling federated learning, in accordance with the present disclosure.

FIG. 5 is a diagram illustrating an example process 500 performed, for example, by a UE, in accordance with the present disclosure. Example process 500 is an example where the UE (e.g., UE 120) performs operations associated with update resolution signaling in federated learning.

As shown in FIG. 5, in some aspects, process 500 may include determining an update resolution associated with providing, to a base station during a federated learning procedure, an update associated with a machine learning component (block 510). For example, the UE (e.g., using communication manager 704, depicted in FIG. 7) may determine an update resolution associated with providing, to a base station during a federated learning procedure, an update associated with a machine learning component, as described above.

As further shown in FIG. 5, in some aspects, process 500 may include transmitting the update to the base station based at least in part on the update resolution (block 520). For example, the UE (e.g., using transmission component 706, depicted in FIG. 7) may transmit the update to the base station based at least in part on the update resolution, as described above.

Process 500 may include additional aspects, such as any single aspect or any combination of aspects described below and/or in connection with one or more other processes described elsewhere herein.

In a first aspect, process 500 includes receiving, from the base station, an update resolution configuration that indicates the update resolution, wherein determining the update resolution comprises determining the update resolution based at least in part on the update resolution configuration.

In a second aspect, alone or in combination with the first aspect, the update resolution configuration is carried in an RRC message, a MAC-CE, and/or a DCI transmission, among other examples.

In a third aspect, alone or in combination with one or more of the first and second aspects, the update resolution corresponds to a first set of federated learning rounds, and wherein the update resolution configuration indicates an additional update resolution that corresponds to a second set of federated learning rounds.

In a fourth aspect, alone or in combination with one or more of the first through third aspects, process 500 includes determining a round index associated with a current federated learning round, and determining that the round index corresponds to the first set of federated learning rounds, wherein determining the update resolution comprises determining the update resolution based at least in part on determining that the round index corresponds to the first set of federated learning rounds.

In a fifth aspect, alone or in combination with one or more of the first through fourth aspects, process 500 includes transmitting an indication of the update resolution to the base station.

In a sixth aspect, alone or in combination with one or more of the first through fifth aspects, transmitting the indication of the update resolution comprises transmitting the indication of the update resolution with the update.

In a seventh aspect, alone or in combination with one or more of the first through sixth aspects, determining the update resolution comprises determining the update resolution based at least in part on a resolution capability of the UE.

In an eighth aspect, alone or in combination with one or more of the first through seventh aspects, determining the update resolution comprises determining the update resolution based at least in part on a size of a message carrying the update.

In a ninth aspect, alone or in combination with one or more of the first through eighth aspects, process 500 includes refraining from transmitting a buffer status report based at least in part on the size of the message carrying the update.

In a tenth aspect, alone or in combination with one or more of the first through ninth aspects, the machine learning component comprises a neural network.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
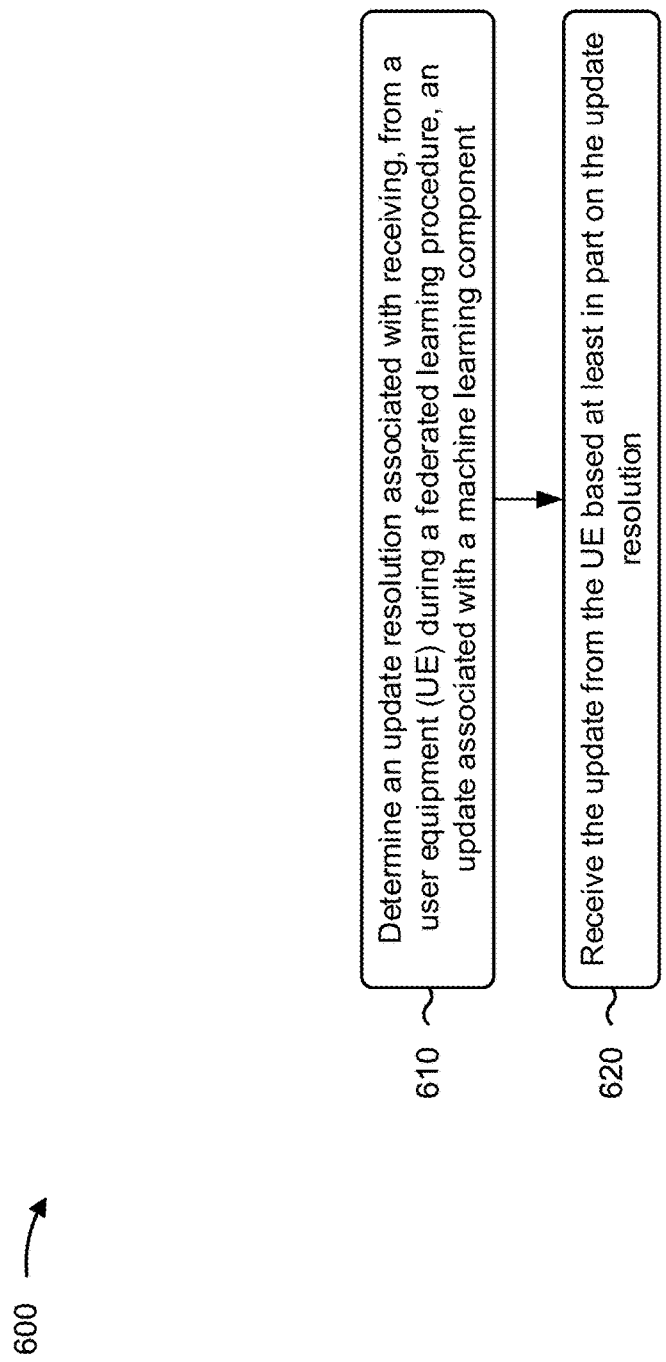

FIG. 6 is a diagram illustrating an example process 600 performed, for example, by a base station, in accordance with the present disclosure. Example process 600 is an example where the base station (e.g., base station 110) performs operations associated with update resolution signaling in federated learning.

As shown in FIG. 6, in some aspects, process 600 may include determining an update resolution associated with receiving, from a UE during a federated learning procedure, an update associated with a machine learning component (block 610). For example, the base station (e.g., using communication manager 904, depicted in FIG. 9) may determine an update resolution associated with receiving, from a UE during a federated learning procedure, an update associated with a machine learning component, as described above.

As further shown in FIG. 6, in some aspects, process 600 may include receiving the update from the UE based at least in part on the update resolution (block 620). For example, the base station (e.g., using reception component 902, depicted in FIG. 9) may receive the update from the UE based at least in part on the update resolution, as described above.

Process 600 may include additional aspects, such as any single aspect or any combination of aspects described below and/or in connection with one or more other processes described elsewhere herein.

In a first aspect, process 600 includes transmitting, to the UE, an update resolution configuration that indicates the update resolution, wherein the update resolution is based at least in part on the update resolution configuration.

In a second aspect, alone or in combination with the first aspect, the update resolution configuration is carried in an RRC message, a MAC-CE, and/or a DCI transmission, among other examples.

In a third aspect, alone or in combination with one or more of the first and second aspects, the update resolution corresponds to a first set of federated learning rounds, and wherein the update resolution configuration indicates an additional update resolution that corresponds to a second set of federated learning rounds.

In a fourth aspect, alone or in combination with one or more of the first through third aspects, the update resolution is based at least in part on a determination that a round index associated with a current federated learning round corresponds to the first set of federated learning rounds.

In a fifth aspect, alone or in combination with one or more of the first through fourth aspects, process 600 includes receiving an indication of the update resolution from the UE.

In a sixth aspect, alone or in combination with one or more of the first through fifth aspects, receiving the indication of the update resolution comprises receiving the indication of the update resolution with the update.

In a seventh aspect, alone or in combination with one or more of the first through sixth aspects, the update resolution is based at least in part on a resolution capability of the UE.

In an eighth aspect, alone or in combination with one or more of the first through seventh aspects, the update resolution is based at least in part on a size of a message carrying the update.

In a ninth aspect, alone or in combination with one or more of the first through eighth aspects, the machine learning component comprises a neural network.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
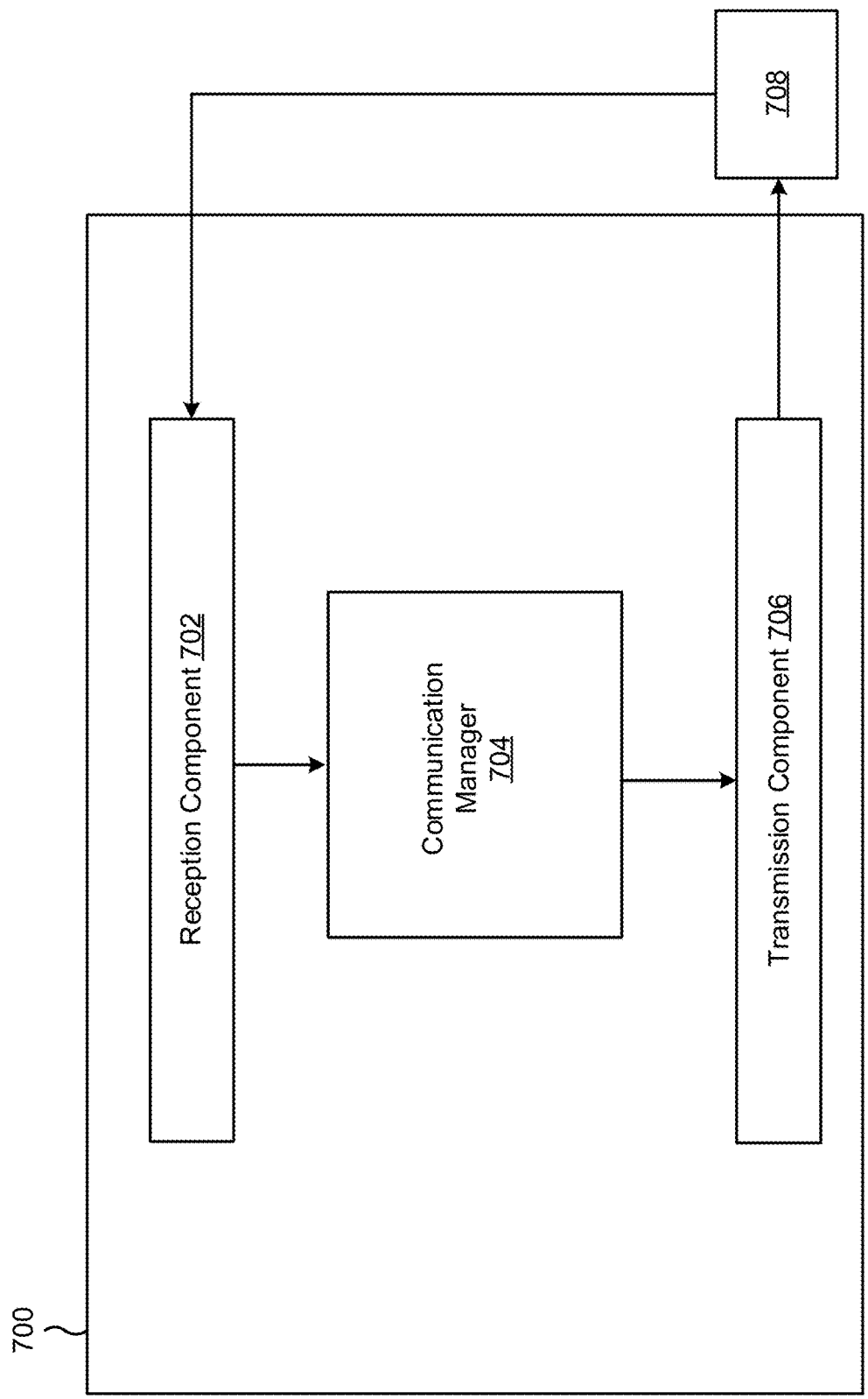
FIGS. 7-10 are block diagrams of example apparatuses for wireless communication, in accordance with the present disclosure.

FIG. 7 is a block diagram of an example apparatus 700 for wireless communication in accordance with the present disclosure. The apparatus 700 may be, be similar to, include, or be included in a UE (e.g., UE 405 shown in FIG. 4). In some aspects, the apparatus 700 includes a reception component 702, a communication manager 704, and a transmission component 706, which may be in communication with one another (for example, via one or more buses). As shown, the apparatus 700 may communicate with another apparatus 708 (such as a client, a server, a UE, a base station, or another wireless communication device) using the reception component 702 and the transmission component 706.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 may include one or more components of UE 120 described above in connection with FIG. 2.

The reception component 702 may provide means for receiving communications, such as reference signals, control information, data communications, or a combination thereof, from the apparatus 708. The reception component 702 may provide received communications to one or more other components of the apparatus 700, such as the communication manager 704. In some aspects, the reception component 702 may provide means for signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include one or more antennas, a demodulator, a MIMO detector, a receive processor, a controller/processor, a memory, or a combination thereof, of UE 120 described above in connection with FIG. 2.

The transmission component 706 may provide means for transmitting communications, such as reference signals, control information, data communications, or a combination thereof, to the apparatus 708. In some aspects, the communication manager 704 may generate communications and may transmit the generated communications to the transmission component 706 for transmission to the apparatus 708. In some aspects, the transmission component 706 may provide means for performing signal processing on the generated communications (such as filtering, amplification, modulation, digital-to-analog conversion, multiplexing, interleaving, mapping, or encoding, among other examples), and may transmit the processed signals to the apparatus 708. In some aspects, the transmission component 706 may include one or more antennas, a modulator, a transmit MIMO processor, a transmit processor, a controller/processor, a memory, or a combination thereof, of UE 120 described above in connection with FIG. 2. In some aspects, the transmission component 706 may be co-located with the reception component 702 in a transceiver.

In some aspects, the communication manager 704 may provide means for determining an update resolution associated with providing, to a base station during a federated learning procedure, an update associated with a machine learning component; and transmitting the update to the base station based at least in part on the update resolution. In some aspects, the communication manager 704 may include a controller/processor, a memory, or a combination thereof, of UE 120 described above in connection with FIG. 2. In some aspects, the communication manager 704 may include the reception component 702 and/or the transmission component 706, among other examples. In some aspects, the means provided by the communication manager 704 may include, or be included within, means provided by the reception component 702 and/or the transmission component 706, among other examples.

In some aspects, the communication manager 704 and/or one or more components of the communication manager 704 may include or may be implemented within hardware (e.g., some or all of the circuitry described in connection with FIG. 2). In some aspects, the communication manager 704 and/or one or more components thereof may include or may be implemented within a controller/processor, a memory, or a combination thereof, of the UE 120 described above in connection with FIG. 2.

In some aspects, the communication manager 704 and/or one or more components of the communication manager 704 may be implemented in code (e.g., as software or firmware stored in a memory). For example, the communication manager 704 and/or a component (or a portion of a component) of the communication manager 704 may be implemented as instructions or code stored in a non-transitory computer-readable medium and executable by a controller or a processor to perform the functions or operations of the communication manager 704 and/or the component. If implemented in code, the functions of the communication manager 704 and/or a component may be executed by a controller/processor, a memory, a scheduler, a communication unit, or a combination thereof, of the UE 120 described above in connection with FIG. 2.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
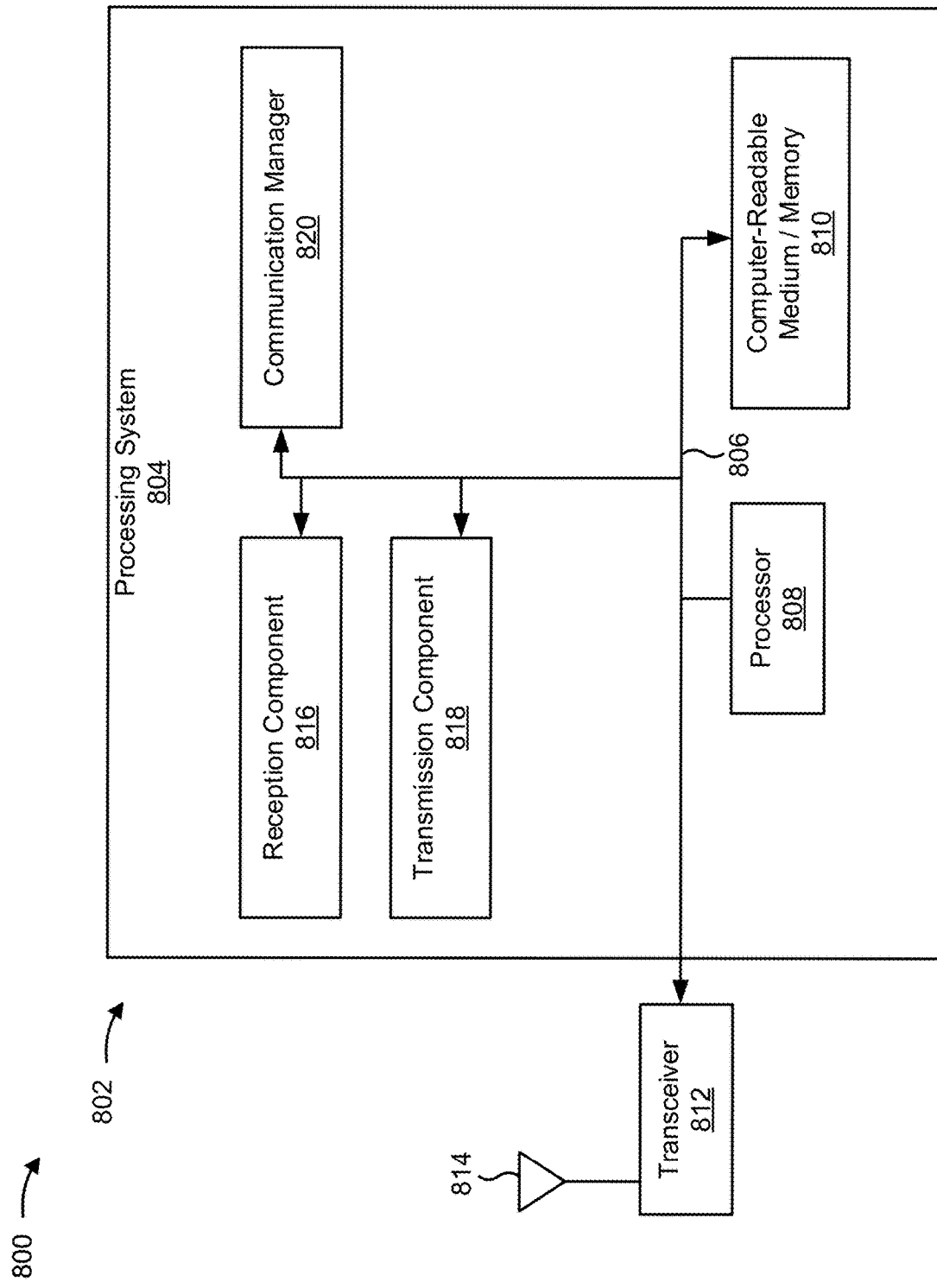

FIG. 8 is a diagram illustrating an example 800 of a hardware implementation for an apparatus 802 employing a processing system 804. The apparatus 802 may be, be similar to, include, or be included in the apparatus 700 shown in FIG. 7.

The processing system 804 may be implemented with a bus architecture, represented generally by the bus 806. The bus 806 may include any number of interconnecting buses and bridges depending on the specific application of the processing system 804 and the overall design constraints. The bus 806 links together various circuits including one or more processors and/or hardware components, represented by a processor 808, the illustrated components, and the computer-readable medium/memory 810. The bus 806 may also link various other circuits, such as timing sources, peripherals, voltage regulators, and/or power management circuits, among other examples.

The processing system 804 may be coupled to a transceiver 812. The transceiver 812 is coupled to one or more antennas 814. The transceiver 812 provides a means for communicating with various other apparatuses over a transmission medium. The transceiver 812 receives a signal from the one or more antennas 814, extracts information from the received signal, and provides the extracted information to the processing system 804, specifically a reception component 816. In addition, the transceiver 812 receives information from the processing system 804, specifically a transmission component 818, and generates a signal to be applied to the one or more antennas 814 based at least in part on the received information.

The processor 808 is coupled to the computer-readable medium/memory 810. The processor 808 is responsible for general processing, including the execution of software stored on the computer-readable medium/memory 810. The software, when executed by the processor 808, causes the processing system 804 to perform the various functions described herein in connection with a client. The computer-readable medium/memory 810 may also be used for storing data that is manipulated by the processor 808 when executing software. The processing system 804 may include any number of additional components not illustrated in FIG. 8. The components illustrated and/or not illustrated may be software modules running in the processor 808, resident/stored in the computer readable medium/memory 810, one or more hardware modules coupled to the processor 808, or some combination thereof.

In some aspects, the processing system 804 may be a component of the UE 120 and may include the memory 282 and/or at least one of the TX MIMO processor 266, the receive (RX) processor 258, and/or the controller/processor 280. In some aspects, the apparatus 802 for wireless communication provides means for determining an update resolution associated with providing, to a base station during a federated learning procedure, an update associated with a machine learning component; and transmitting the update to the base station based at least in part on the update resolution. The aforementioned means may be one or more of the aforementioned components of the processing system 804 of the apparatus 802 configured to perform the functions recited by the aforementioned means. As described elsewhere herein, the processing system 804 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 8 is provided as an example. Other examples may differ from what is described in connection with FIG. 8.

Figure 9:
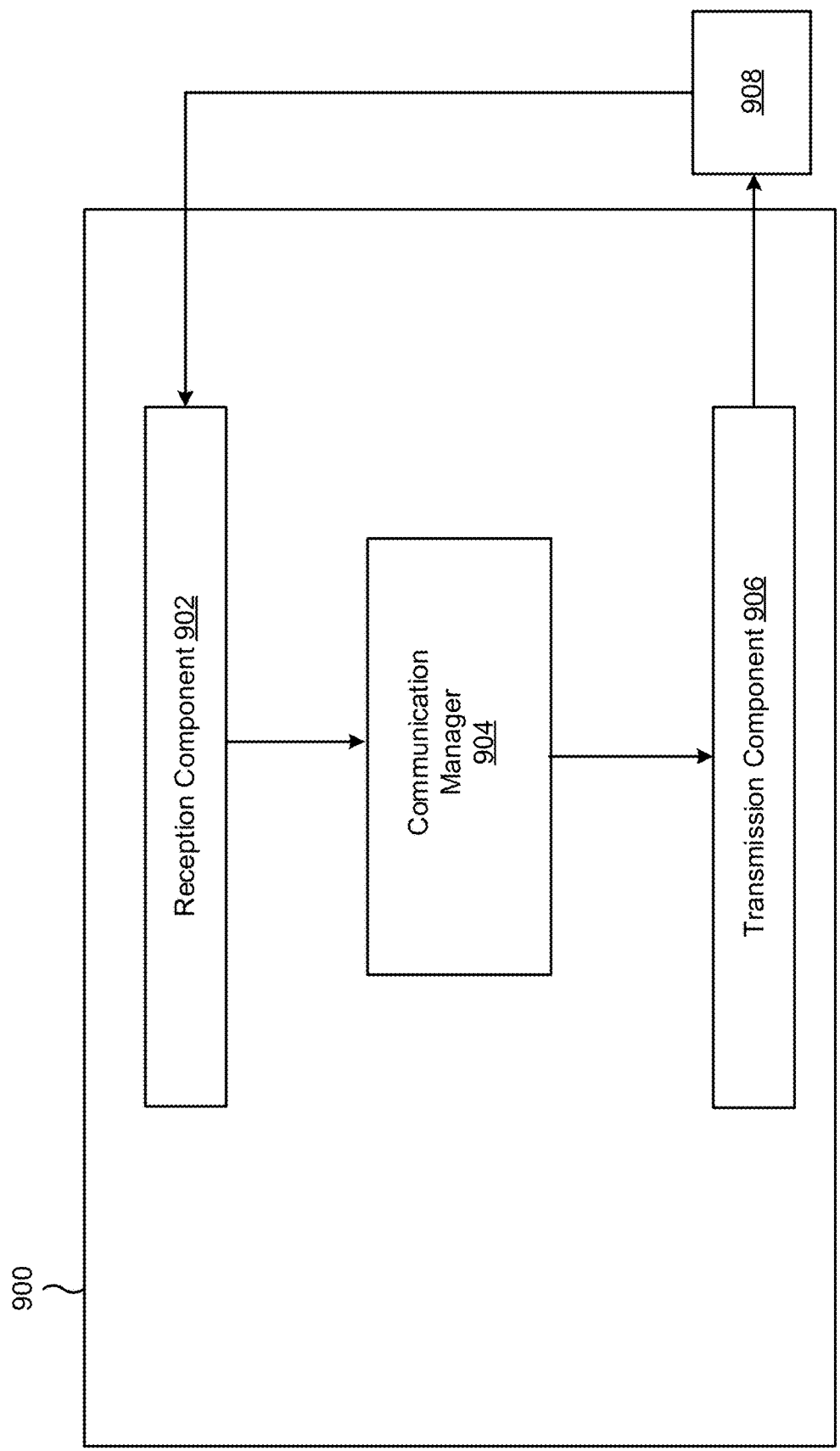

FIG. 9 is a block diagram of an example apparatus 900 for wireless communication in accordance with the present disclosure. The apparatus 900 may be, be similar to, include, or be included in a base station (e.g., base station 410 shown in FIG. 4). In some aspects, the apparatus 900 includes a reception component 902, a communication manager 904, and a transmission component 906, which may be in communication with one another (for example, via one or more buses). As shown, the apparatus 900 may communicate with another apparatus 908 (such as a client, a server, a UE, a base station, or another wireless communication device) using the reception component 902 and the transmission component 906.

In some aspects, the apparatus 900 may be configured to perform one or more operations described herein in connection with FIG. 4. Additionally, or alternatively, the apparatus 900 may be configured to perform one or more processes described herein, such as process 600 of FIG. 6. In some aspects, the apparatus 900 may include one or more components of the base station described above in connection with FIG. 2.

The reception component 902 may provide means for receiving communications, such as reference signals, control information, data communications, or a combination thereof, from the apparatus 908. The reception component 902 may provide received communications to one or more other components of the apparatus 900, such as the communication manager 904. In some aspects, the reception component 902 may provide means for performing signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the base station described above in connection with FIG. 2.

The transmission component 906 may provide means for transmitting communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may provide means for performing signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the base station described above in connection with FIG. 2. In some aspects, the transmission component 906 may be co-located with the reception component 902 in a transceiver.

The communication manager 904 may provide means for determining an update resolution associated with receiving, from a UE during a federated learning procedure, an update associated with a machine learning component; and receiving the update from the UE based at least in part on the update resolution. In some aspects, the communication manager 904 may include a controller/processor, a memory, a scheduler, a communication unit, or a combination thereof, of the base station described above in connection with FIG. 2. In some aspects, the communication manager 904 may include the reception component 902 and/or the transmission component 906, among other examples. In some aspects, the means provided by the communication manager 904 may include, or be included within, means provided by the reception component 902 and/or the transmission component 906, among other examples.

In some aspects, the communication manager 904 and/or one or more components thereof may include or may be implemented within hardware (e.g., some or all of the circuitry described in connection with FIG. 2). In some aspects, the communication manager 904 and/or one or more components thereof may include or may be implemented within a controller/processor, a memory, or a combination thereof, of the BS 110 described above in connection with FIG. 2.

In some aspects, the communication manager 904 and/or one or more components thereof may be implemented in code (e.g., as software or firmware stored in a memory). For example, the communication manager 904 and/or a component (or a portion of a component) of the communication manager 904 may be implemented as instructions or code stored in a non-transitory computer-readable medium and executable by a controller or a processor to perform the functions or operations of the communication manager 904 and/or the component. If implemented in code, the functions of the communication manager 904 and/or a component may be executed by a controller/processor, a memory, a scheduler, a communication unit, or a combination thereof, of the BS 110 described above in connection with FIG. 2.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
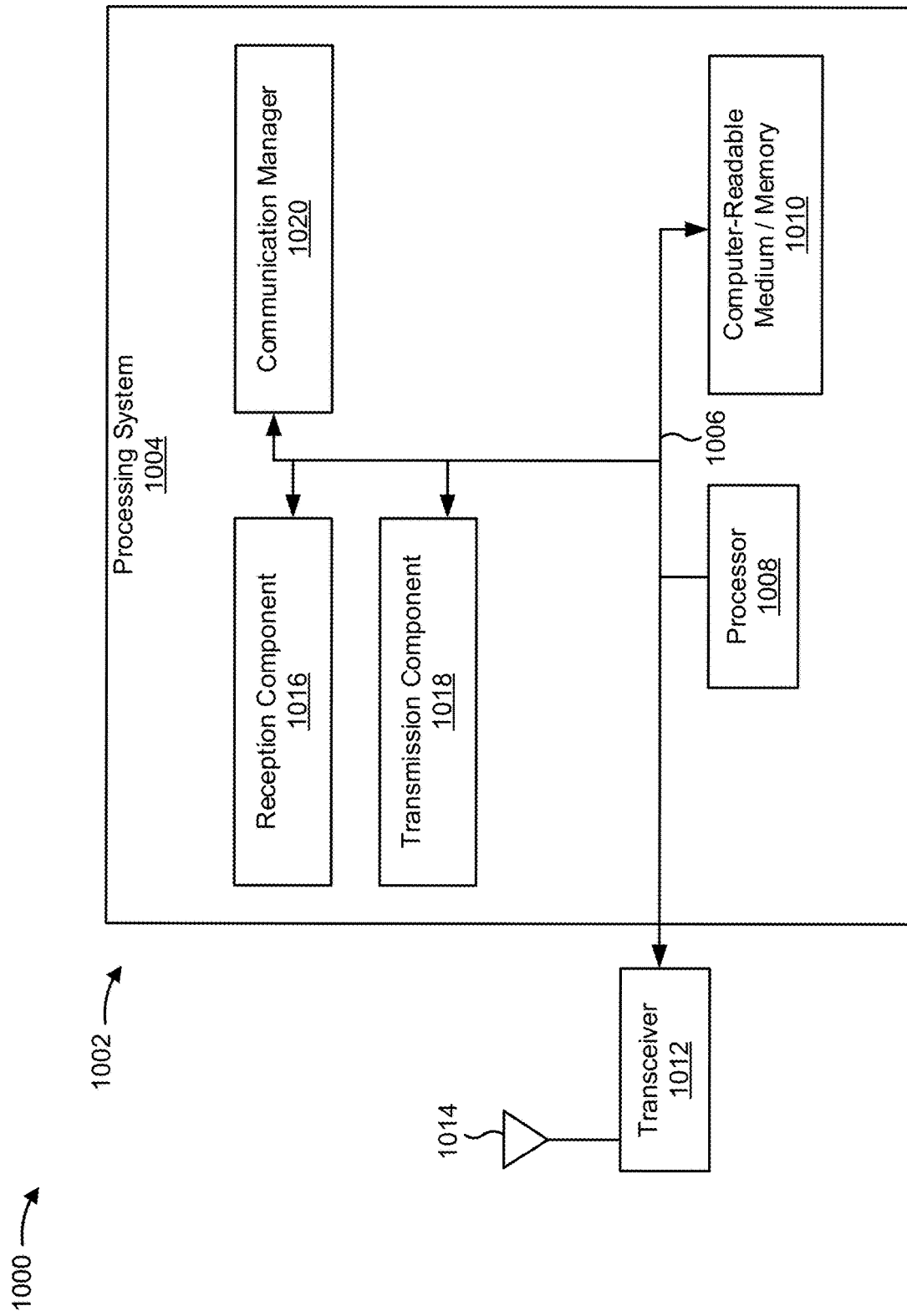

FIG. 10 is a diagram illustrating an example 1000 of a hardware implementation for an apparatus 1002 employing a processing system 1004. The apparatus 1002 may be, be similar to, include, or be included in the apparatus 900 shown in FIG. 9.

The processing system 1004 may be implemented with a bus architecture, represented generally by the bus 1006. The bus 1006 may include any number of interconnecting buses and bridges depending on the specific application of the processing system 1004 and the overall design constraints. The bus 1006 links together various circuits including one or more processors and/or hardware components, represented by a processor 1008, the illustrated components, and the computer-readable medium/memory 1010. The bus 1006 may also link various other circuits, such as timing sources, peripherals, voltage regulators, and/or power management circuits, among other examples.

The processing system 1004 may be coupled to a transceiver 1012. The transceiver 1012 is coupled to one or more antennas 1014. The transceiver 1012 provides a means for communicating with various other apparatuses over a transmission medium. The transceiver 1012 receives a signal from the one or more antennas 1014, extracts information from the received signal, and provides the extracted information to the processing system 1004, specifically a reception component 1016. In addition, the transceiver 1012 receives information from the processing system 1004, specifically a transmission component 1018, and generates a signal to be applied to the one or more antennas 1014 based at least in part on the received information.

The processor 1008 is coupled to the computer-readable medium/memory 1010. The processor 1008 is responsible for general processing, including the execution of software stored on the computer-readable medium/memory 1010. The software, when executed by the processor 1008, causes the processing system 1004 to perform the various functions described herein in connection with a server. The computer-readable medium/memory 1010 may also be used for storing data that is manipulated by the processor 1008 when executing software. The processing system 1004 may include any number of additional components not illustrated in FIG. 10. The components illustrated and/or not illustrated may be software modules running in the processor 1008, resident/stored in the computer readable medium/memory 1010, one or more hardware modules coupled to the processor 1008, or some combination thereof.

In some aspects, the processing system 1004 may be a component of the UE 120 and may include the memory 282 and/or at least one of the TX MIMO processor 266, the RX processor 258, and/or the controller/processor 280. In some aspects, the apparatus 1002 for wireless communication provides means for determining an update resolution associated with receiving, from a UE during a federated learning procedure, an update associated with a machine learning component; and receiving the update from the UE based at least in part on the update resolution. The aforementioned means may be one or more of the aforementioned components of the processing system 1004 of the apparatus 1002 configured to perform the functions recited by the aforementioned means. As described elsewhere herein, the processing system 1004 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 10 is provided as an example. Other examples may differ from what is described in connection with FIG. 10.

The following provides an overview of some Aspects of the present disclosure:

Aspect 1: A method of wireless communication performed by a user equipment (UE), comprising: determining an update resolution associated with providing, to a base station during a federated learning procedure, an update associated with a machine learning component; and transmitting the update to the base station based at least in part on the update resolution.

Aspect 2: The method of Aspect 1, further comprising receiving, from the base station, an update resolution configuration that indicates the update resolution, wherein determining the update resolution comprises determining the update resolution based at least in part on the update resolution configuration.

Aspect 3: The method of Aspect 2, wherein the update resolution configuration is carried in at least one of: a radio resource control message, a medium access control (MAC) control element, or a downlink control information transmission.

Aspect 4: The method of either of Aspects 2 or 3, wherein the update resolution corresponds to a first set of federated learning rounds, and wherein the update resolution configuration indicates an additional update resolution that corresponds to a second set of federated learning rounds.

Aspect 5: The method of Aspect 4, further comprising: determining a round index associated with a current federated learning round; and determining that the round index corresponds to the first set of federated learning rounds, wherein determining the update resolution comprises determining the update resolution based at least in part on determining that the round index corresponds to the first set of federated learning rounds.

Aspect 6: The method of any of Aspects 1-5, further comprising transmitting an indication of the update resolution to the base station.

Aspect 7: The method of Aspect 6, wherein transmitting the indication of the update resolution comprises transmitting the indication of the update resolution with the update.

Aspect 8: The method of either of Aspects 6 or 7, wherein determining the update resolution comprises determining the update resolution based at least in part on a resolution capability of the UE.

Aspect 9: The method of any of Aspects 1-8, wherein determining the update resolution comprises determining the update resolution based at least in part on a size of a message carrying the update.

Aspect 10: The method of Aspect 9, further comprising refraining from transmitting a buffer status report based at least in part on the size of the message carrying the update.

Aspect 11: The method of any of Aspects 1-10, wherein the machine learning component comprises a neural network.

Aspect 12: A method of wireless communication performed by a base station, comprising: determining an update resolution associated with receiving, from a user equipment (UE) during a federated learning procedure, an update associated with a machine learning component; and receiving the update from the UE based at least in part on the update resolution.

Aspect 13: The method of Aspect 12, further comprising transmitting, to the UE, an update resolution configuration that indicates the update resolution, wherein the update resolution is based at least in part on the update resolution configuration.

Aspect 14: The method of Aspect 13, wherein the update resolution configuration is carried in at least one of: a radio resource control message, a medium access control (MAC) control element, or a downlink control information transmission.

Aspect 15: The method of either of Aspects 13 or 14, wherein the update resolution corresponds to a first set of federated learning rounds, and wherein the update resolution configuration indicates an additional update resolution that corresponds to a second set of federated learning rounds.

Aspect 16: The method of Aspect 15, wherein the update resolution is based at least in part on a determination that a round index associated with a current federated learning round corresponds to the first set of federated learning rounds.

Aspect 17: The method of any of Aspects 12-16, further comprising receiving an indication of the update resolution from the UE.

Aspect 18: The method of Aspect 17, wherein receiving the indication of the update resolution comprises receiving the indication of the update resolution with the update.

Aspect 19: The method of any of Aspects 12-18, wherein the update resolution is based at least in part on a resolution capability of the UE.

Aspect 20: The method of any of Aspects 12-19, wherein the update resolution is based at least in part on a size of a message carrying the update.

Aspect 21: The method of any of Aspects 12-20, wherein the machine learning component comprises a neural network.

Aspect 22: An apparatus for wireless communication at a device, comprising a processor; memory coupled with the processor; and instructions stored in the memory and executable by the processor to cause the apparatus to perform the method of one or more of Aspects 1-11.

Aspect 23: A device for wireless communication, comprising a memory and one or more processors coupled to the memory, the one or more processors configured to perform the method of one or more of Aspects 1-11.

Aspect 24: An apparatus for wireless communication, comprising at least one means for performing the method of one or more of Aspects 1-11.

Aspect 25: A non-transitory computer-readable medium storing code for wireless communication, the code comprising instructions executable by a processor to perform the method of one or more of Aspects 1-11.

Aspect 26: A non-transitory computer-readable medium storing a set of instructions for wireless communication, the set of instructions comprising one or more instructions that, when executed by one or more processors of a device, cause the device to perform the method of one or more of Aspects 1-11.

Aspect 27: An apparatus for wireless communication at a device, comprising a processor; memory coupled with the processor; and instructions stored in the memory and executable by the processor to cause the apparatus to perform the method of one or more of Aspects 12-21.

Aspect 28: A device for wireless communication, comprising a memory and one or more processors coupled to the memory, the one or more processors configured to perform the method of one or more of Aspects 12-21.

Aspect 29: An apparatus for wireless communication, comprising at least one means for performing the method of one or more of Aspects 12-21.

Aspect 30: A non-transitory computer-readable medium storing code for wireless communication, the code comprising instructions executable by a processor to perform the method of one or more of Aspects 12-21.

Aspect 31: A non-transitory computer-readable medium storing a set of instructions for wireless communication, the set of instructions comprising one or more instructions that, when executed by one or more processors of a device, cause the device to perform the method of one or more of Aspects 12-21.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive, from a network node, an update resolution configuration that indicates an update resolution, corresponding to a first set of federated learning rounds, and an additional update resolution, corresponding to a second set of federated learning rounds;
      determine that a round index, associated with a current federated learning round, corresponds to the first set of federated learning rounds;
      determine, based at least in part on determining that the round index corresponds to the first set of federated learning rounds, the update resolution, wherein the update resolution is associated with providing, during a federated learning procedure, an update corresponding to a set of parameters of a machine learning component, wherein the update resolution corresponds to a quantization scheme; and
      transmit the update based at least in part on the update resolution.

2. The UE of claim 1, wherein the update resolution configuration is carried in at least one of:
   a radio resource control message,
   a medium access control (MAC) control element, or
   a downlink control information transmission.

3. The UE of claim 1, wherein the one or more processors are further configured to:
   determine the round index associated with the current federated learning round.

4. The UE of claim 1, wherein the one or more processors are further configured to transmit an indication of the update resolution to the network node.

5. The UE of claim 4, wherein the one or more processors, to transmit the indication of the update resolution, are configured to transmit the indication of the update resolution with the update.

6. The UE of claim 4, wherein the one or more processors, to determine the update resolution, are configured to determine the update resolution based at least in part on a resolution capability of the UE.

7. The UE of claim 1, wherein the one or more processors, to determine the update resolution, are configured to determine the update resolution based at least in part on a size of a message carrying the update.

8. The UE of claim 7, wherein the one or more processors are further configured to refrain from transmitting a buffer status report based at least in part on the size of the message carrying the update.

9. The UE of claim 1, wherein the machine learning component comprises a neural network.

10. The UE of claim 1, wherein the quantization scheme comprises one or more of:
    a first update resolution corresponding to first quantization levels that are higher than second quantization levels corresponding to a second update resolution that is lower than the first update resolution, or the first update resolution corresponding to a first number of bits that is higher and more accurate than a second number of bits corresponding to the second update resolution, and wherein the update resolution is the first update resolution or the second update resolution.

11. The UE of claim 1, wherein the one or more processors are configured to:

receive the machine learning component.

12. A network entity for wireless communication, comprising:

one or more memories; and one or more processors, coupled to the one or more memories, configured to:

transmit, to a user equipment (UE), an update resolution configuration that indicates an update resolution, corresponding to a first set of federated learning rounds, and an additional update resolution corresponds to a second set of federated learning rounds;

determine, based at least in part on the update resolution configuration and a round index associated with a current federated learning round corresponding to the first set of federated learning rounds, the update resolution, wherein the update resolution is associated with receiving, from the UE during a federated learning procedure, an update corresponding to a set of parameters of a machine learning component, wherein the update resolution corresponds to a quantization scheme; and receive, from the UE, the update based at least in part on the update resolution.

13. The network entity of claim 12, wherein the update resolution configuration is carried in at least one of:

a radio resource control message, a medium access control (MAC) control element, or a downlink control information transmission.

14. The network entity of claim 12, wherein the one or more processors are further configured to receive an indication of the update resolution from the UE.

15. The network entity of claim 14, wherein the one or more processors, to receive the indication of the update resolution, are configured to receive the indication of the update resolution with the update.

16. The network entity of claim 12, wherein the update resolution is based at least in part on a resolution capability of the UE.

17. The network entity of claim 12, wherein the update resolution is based at least in part on a size of a message carrying the update.

18. The network entity of claim 12, wherein the machine learning component comprises a neural network.

19. A method of wireless communication performed by a user equipment (UE), comprising:

receiving, from a network node, an update resolution configuration that indicates an update resolution, corresponding to a first set of federated learning rounds, and an additional update resolution, corresponding to a second set of federated learning rounds;

determining that a round index, associated with a current federated learning round, corresponds to the first set of federated learning rounds;

determining, based at least in part on determining that the round index corresponds to the first set of federated learning rounds, the update resolution, wherein the updated resolution is associated with providing, during a federated learning procedure, an update corresponding to a set of parameters of a machine learning component, wherein the update resolution corresponds to a quantization scheme; and transmitting the update based at least in part on the update resolution.

20. The method of claim 19, further comprising:

determining the round index associated with the current federated learning round.

21. The method of claim 19, further comprising:

transmitting an indication of the update resolution to the network node.

22. The method of claim 21, wherein transmitting the indication of the update resolution comprises transmitting the indication of the update resolution with the update.

23. The method of claim 21, wherein determining the update resolution comprises determining the update resolution based at least in part on a resolution capability of the UE.

24. The method of claim 19, wherein the update resolution configuration is carried in at least one of:

a radio resource control message, a medium access control (MAC) control element, or a downlink control information transmission.

25. The method of claim 19, wherein determining the update resolution comprises determining the update resolution based at least in part on a size of a message carrying the update.

26. The method of claim 25, further comprising refraining from transmitting a buffer status report based at least in part on the size of the message carrying the update.

27. The method of claim 19, wherein the machine learning component comprises a neural network.

28. A method of wireless communication, comprising:

transmitting, to a user equipment (UE), an update resolution configuration that indicates an update resolution, corresponding to a first set of federated learning rounds, and an additional update resolution corresponds to a second set of federated learning rounds;

determining, based at least in part on the update resolution configuration and a round index associated with a current federated learning round corresponding to the first set of federated learning rounds, the update resolution, wherein the update resolution is associated with receiving, from the UE during a federated learning procedure, an update corresponding to a set of parameters of a machine learning component, wherein the update resolution corresponds to a quantization scheme; and receiving, from the UE, the update based at least in part on the update resolution.

29. The method of claim 28, wherein the update resolution configuration is carried in at least one of:

a radio resource control message, a medium access control (MAC) control element, or a downlink control information transmission.

30. The method of claim 28, further comprising receiving an indication of the update resolution from the UE.

31. The method of claim 28, wherein at least one of:

the update resolution is based at least in part on one or more of: a resolution capability of the UE or a size of a message carrying the update, or the machine learning component comprises a neural network.

* * * * *